(12) United States Patent
Brixius et al.

(10) Patent No.: US 7,040,477 B2
(45) Date of Patent: May 9, 2006

(54) CONTAINER TRANSPORT SYSTEM

(75) Inventors: Wolfgang Brixius, Neunkirchen (DE); Dominik Gräfer, Dortmund-Wellinghofen (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 9 days.

(21) Appl. No.: 10/789,197

(22) Filed: Feb. 27, 2004

(65) Prior Publication Data

US 2004/0168888 A1 Sep. 2, 2004

(30) Foreign Application Priority Data

Feb. 27, 2003 (DE) ................. 103 08 657
Apr. 4, 2003 (DE) ................. 103 15 475

(51) Int. Cl.
*B65G 47/46* (2006.01)

(52) U.S. Cl. ............... 198/370.08; 198/436; 198/445; 198/601; 198/605; 198/591

(58) Field of Classification Search .......... 198/370.03, 198/427, 436, 445, 456, 468.1, 469.1, 597, 198/601, 605, 607, 370.08, 591
See application file for complete search history.

(56) References Cited

U.S. PATENT DOCUMENTS

| | | | | |
|---|---|---|---|---|
| 3,334,723 A | * | 8/1967 | Reed et al. ............ | 198/370.09 |
| 3,552,541 A | * | 1/1971 | Riggs ..................... | 198/361 |
| 4,280,613 A | * | 7/1981 | Stewart .................. | 198/406 |
| 4,598,815 A | | 7/1986 | Adama | |
| 4,746,003 A | | 5/1988 | Yu et al. | |
| 4,770,589 A | | 9/1988 | Bryan | |
| 5,186,306 A | * | 2/1993 | Sjostrand .............. | 198/442 |
| 5,868,238 A | * | 2/1999 | Bonnet .................. | 198/370.1 |
| 5,944,165 A | * | 8/1999 | Mannlein et al. ........ | 198/442 |
| 6,398,009 B1 | * | 6/2002 | Emery ................... | 198/436 |
| 6,595,349 B1 | * | 7/2003 | MacSwan ............... | 198/607 |
| 6,662,926 B1 | * | 12/2003 | Wood et al. ............ | 198/370.1 |

FOREIGN PATENT DOCUMENTS

| | | |
|---|---|---|
| DE | 21 50 984 | 10/1972 |
| DE | 199 21 131 A1 | 10/2000 |
| WO | WO 99/59901 | 11/1999 |
| WO | WO 00/59811 | 10/2000 |

* cited by examiner

*Primary Examiner*—Gene O. Crawford
*Assistant Examiner*—Mark A. Deuble
(74) *Attorney, Agent, or Firm*—Henry M. Feiereisen

(57) ABSTRACT

A transport system for transport of containers has a switch with an entry zone, an exit zone with at least two different transport paths for conveying a container, and a switch mechanism for selectively controlling the transport of the container to the transport paths. During their travel, the containers are supported by a support assembly, and aligned and advanced in a controlled manner in the entry zone by an alignment and propulsion mechanism. A propulsion and guide assembly in the exit zone is rendered operative in response to a transport of the container along the transport paths and includes at least two modules which respectively cooperate with the transport paths and are disposed in the exit zone below the plane of the support assembly. The modules are hereby so controlled that only the one of the modules is raised into a plane above the plane of the support assembly, when the container is transported along the associated transport path.

14 Claims, 9 Drawing Sheets

CONTAINER TRANSPORT SYSTEM

CROSS-REFERENCES TO RELATED APPLICATIONS

This application claims the priorities of German Patent Applications, Serial Nos. 103 08 657.9, filed Feb. 27, 2003, and 103 15 475.2, filed Apr. 4, 2003, pursuant to 35 U.S.C. 119(a)–(d), the disclosure of which is incorporated herein by reference.

BACKGROUND OF THE INVENTION

The present invention relates to a transport system for transport of containers, in particular to an airport baggage handling system.

German Patent publication DE 199 21 131 A1 describes a switch for a transport system having in transport direction of the containers an entry zone which leads to a switch zone for directing the containers into a desired direction. Following the switch zone is an exit zone from which the containers move in the selected direction. The transport of the containers takes place in a horizontal support plane which is formed by cylindrical rollers. A change in direction of the containers in the switch zone is realized by a group of cooperating modules. Each of the modules includes a rolling body for support of the containers during their advance. The rolling bodies of the modules are hereby swingably supported about a vertical axis via a control mechanism.

It is also known to urge containers to move in a desired direction by means of central guide rails on which guide rollers run that are mounted to the container. As the transport direction of the container does not entirely coincide with the driving direction of the driving rollers, increased wear is encountered. The constraint guidance of the containers takes place spotwise and requires metal insets in the container so that a full screening of the containers in an X-ray machine becomes impossible.

It would be desirable and advantageous to provide an improved transport system with at least one switch to obviate prior art shortcomings and to ensure a substantially frictionless horizontal guidance of the containers in nay intended direction while still being simple in structure.

SUMMARY OF THE INVENTION

According to one aspect of the present invention, a transport system for transport of containers, in particular a baggage handling system, includes at least one switch having an entry zone, an exit zone with at least two different transport paths for conveying a container to conveyors immediately disposed downstream of the exit zone, and a switch mechanism for selectively controlling the transport of the container to the transport paths, a support assembly defining a plane for support of the container between the entry zone and the exit zone, an alignment and propulsion mechanism disposed in the entry zone for aligning and advancing the container in a controlled manner, a propulsion and guide assembly rendered operative in response to a transport of the container along the transport paths, with the propulsion and guide assembly including at least two modules constructed for cooperation with the transport paths in one-to-one correspondence and disposed in the exit zone below the plane of the support assembly, wherein the modules are controlled in such a manner that only the one of the modules is raised into a plane above the plane of the support assembly when the container is transported along the associated transport path.

According to another feature of the present invention, the alignment and propulsion mechanism may have a catch member extending transversely to the plane of the support assembly and constructed for engagement against opposite longitudinal sides of a recess formed in an underside of the container and extending in longitudinal direction of the container to thereby apply a contact pressure upon the container and advance the container.

According to another feature of the present invention, the catch member may include two driving belts which are routed about rollers and have outer belt sides for abutment against the longitudinal sides of the recess, wherein each of the rollers defines an axis extending transversely to the plane of the support assembly. Thus, slight distances between the propelling driving belts are possible so that differences in speed are minimal.

Suitably, the longitudinal sides of the recess extend in parallel relationship.

According to another feature of the present invention, the catch members may be configured as rollers, preferably cone-shaped rollers, which roll on the longitudinal sides of the recess. As a result, the containers can travel with little wear and little noise. Advantageously, the longitudinal sides of the recess extend slantingly outwards away from one another. Precision of the guidance may be further enhanced by configuring each of the longitudinal sides of the recess with increasingly outward curvature toward a mid-section thereof.

According to another feature of the present invention, the support assembly may have rotatably supported ball rollers or sliding surfaces for support of the container so that the guidance takes place with little transverse forces.

According to another feature of the present invention, the switch mechanism may include a passive operating element in the form of a leaf spring, which extends transversely to the plane of the support assembly and has opposite flat sides, and plural guide rollers disposed on the flat sides in parallel relationship, said leaf spring having one end securely fixed in an entry-zone-proximal region and another end outwardly deflectable through bending. The moment transmitted by the leaf spring can be increased when providing a rocker arm for outwardly deflecting the leaf spring, and a four-bar linkage for guiding the leaf spring along a radius of curvature.

According to another feature of the present invention, each of the modules of the propulsion and guide assembly may include rollers extending transversely to the plane of the support assembly, and/or at least one driving belt, for engagement against opposite longitudinal sides of a recess of the container to advance the container.

According to another feature of the present invention, the propulsion and guide assembly may include a servomotor for operating the modules, with the servomotor having a motor shaft for support of cam plates which actuate lifting elements for selectively lifting and lowering the modules.

According to another feature of the present invention, the alignment and propulsion mechanism and/or the propulsion and guide mechanism may be constructed as flat-top chain with prisms or trapezoids disposed transversely to a chain moving direction in parallel relationship, wherein the prisms or trapezoids engage in a longitudinal recess of the container to thereby realize a frictional engagement with slanted longitudinal sides of the recess for guiding and advancing the container, whereby the prisms or trapezoids have outwardly directed sides resting against the longitudinal sides.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
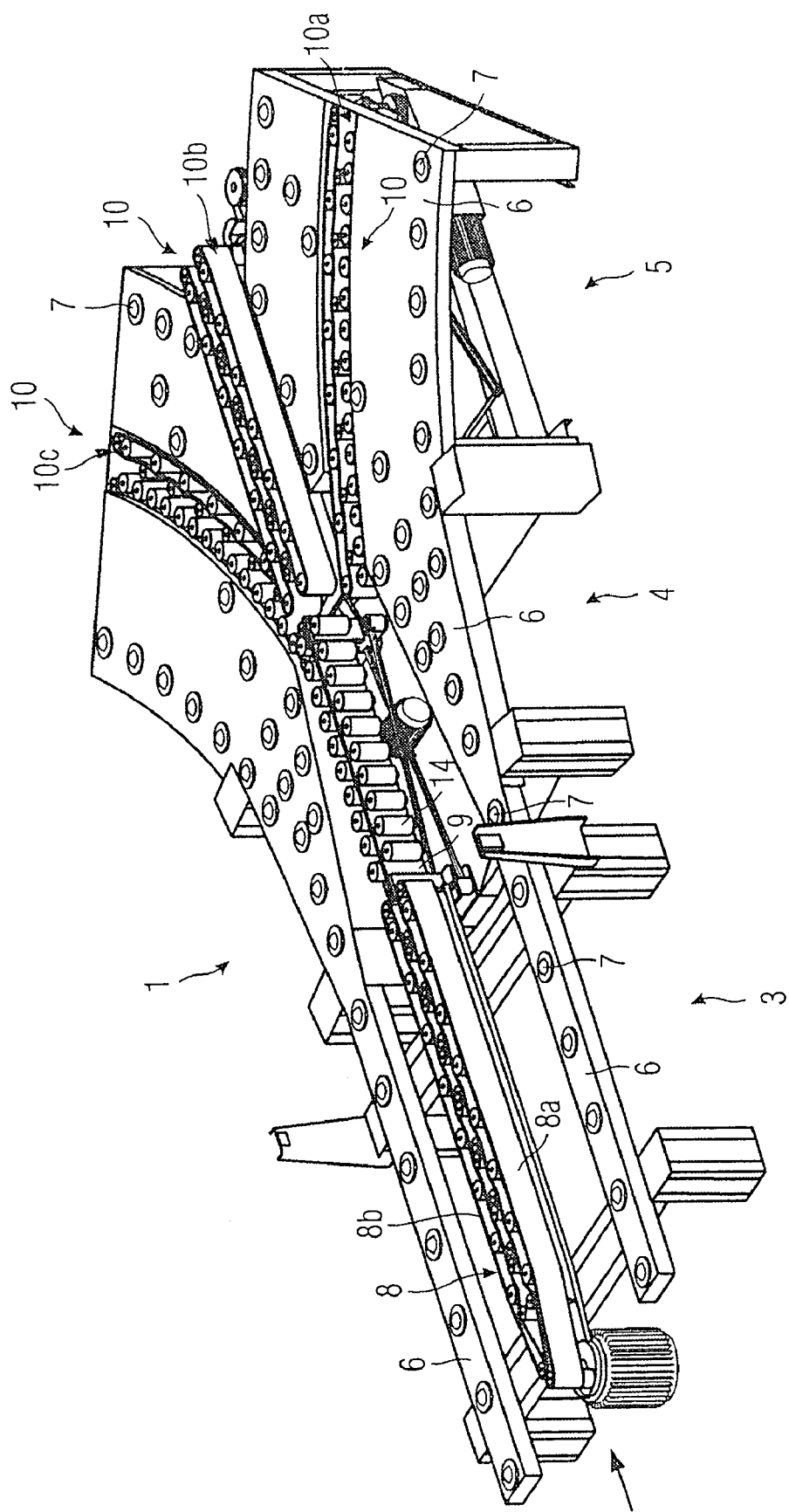
FIG. 1 is a perspective view of a switch for a transport system in accordance with the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of three applications filed on the same day. These applications deal with related inventions. They are commonly owned and have in part different inventive entities. The applications are unique, but incorporate the other by reference. Accordingly, the following U.S. patent applications are hereby expressly incorporated by reference: "Container Transport System and Container for Transport of an Article" and "Transport System for Advancing Containers, and Curve Section of such a Transport System".

Figure 7:
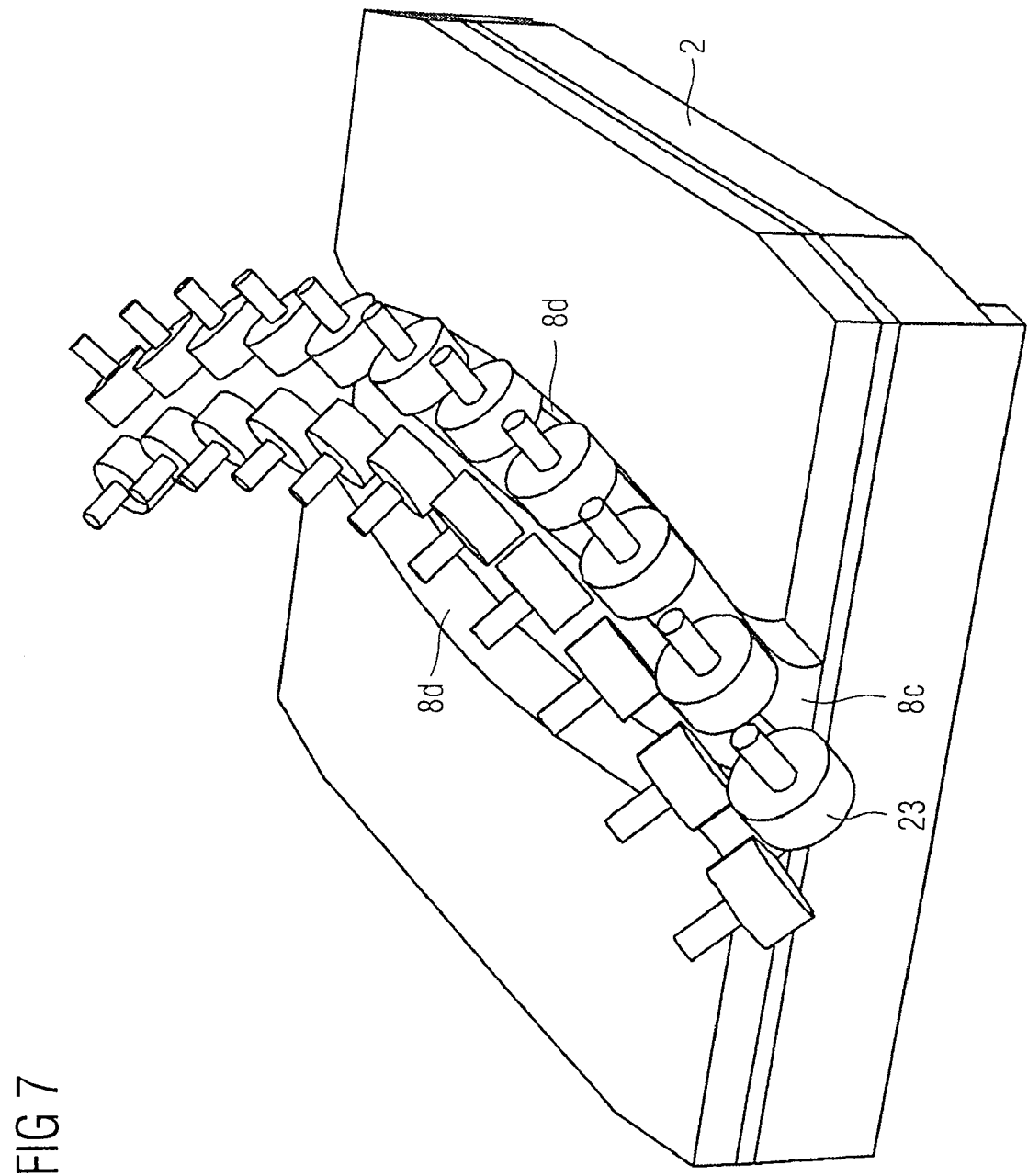
FIG. 7 is a schematic perspective view of a modified switch for transport of a container.
Figure 8:
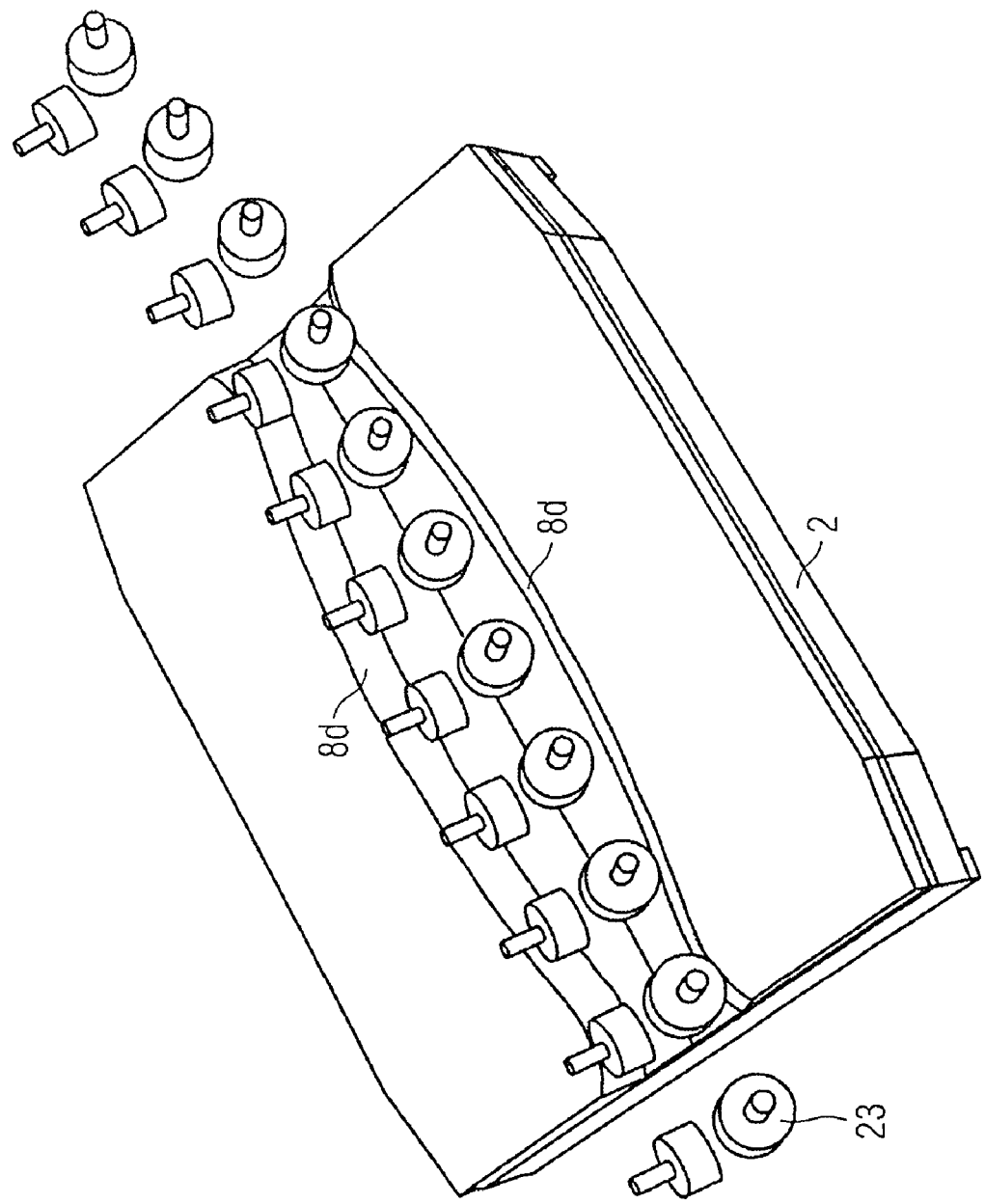
FIG. 8 is a schematic perspective view of a yet another variation of a switch for transport of a container.
Figure 10:
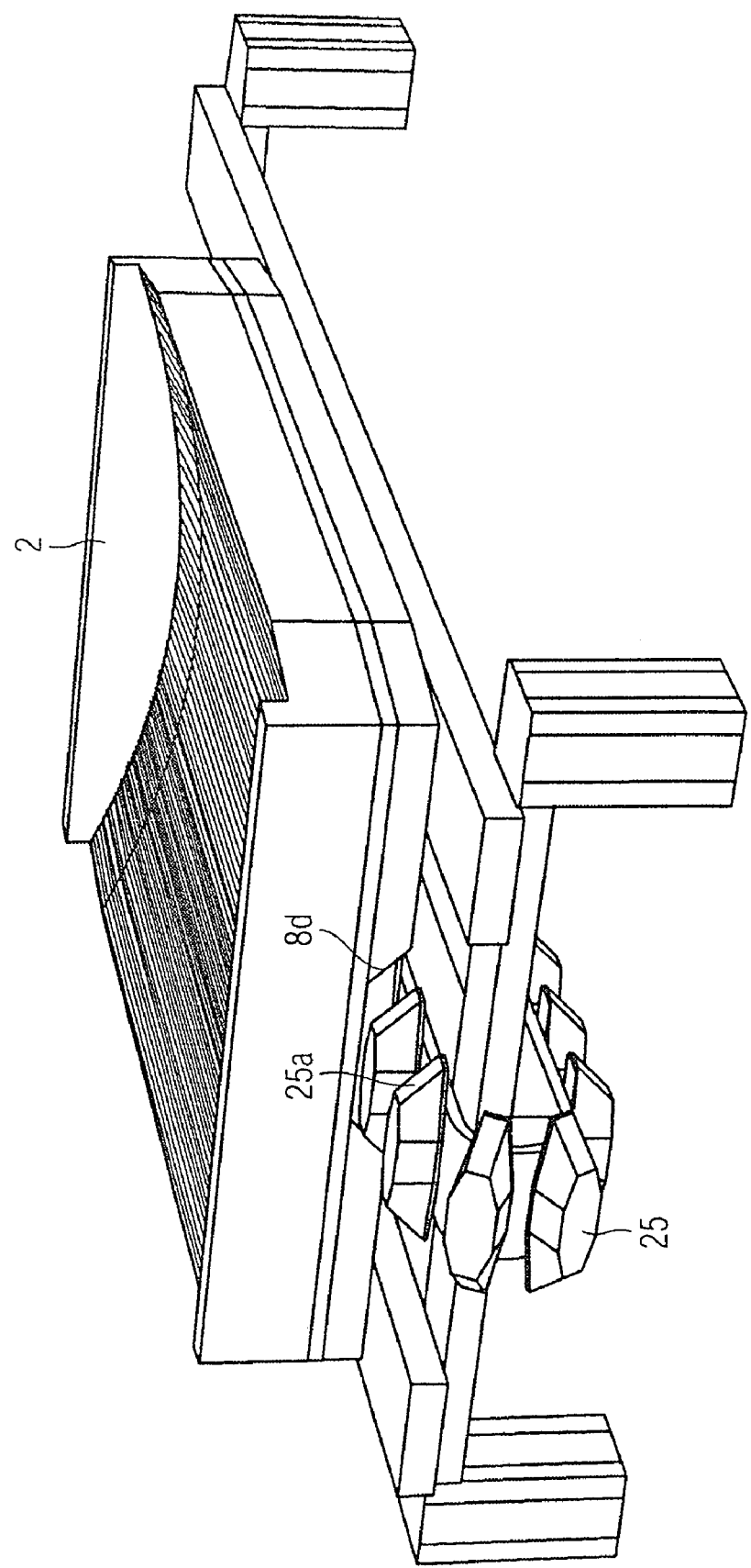
FIG. 10 is a perspective illustration of the propulsion and guide assembly of FIG. 9 with container.

Turning now to the drawing, and in particular to FIG. 1, there is shown a perspective view of a switch 1 for a transport system in accordance with the present invention for transport of containers or trays 2 (depicted in FIGS. 7, 8, 10). This type of transport system is oftentimes installed in a baggage handling system in airports. The containers 2 travel through the switch 1 in direction of the arrow and are first received by an entry zone 3 of the switch 1 and then advanced via a switch zone 4 to an exit zone 5. Depending on which way the switch 1 is positioned, the containers 2 can travel in a straight transport path without change in direction, or to a left transport path or a right transport path, as shown in FIG. 1. The transport system includes a support assembly in the form of plate-shaped support elements 6 with freely rotatable ball rollers 7 for carrying the containers 2. As an alternative, the support elements 6 may also be configured as sliding surfaces.

In the entry zone 3, the containers 2 are properly lined up and propelled in a controlled manner by an alignment and propulsion mechanism, generally designated by reference numeral 8 and configured as a catch member which includes two driving belts 8a, 8b. For interaction with the containers 2, the containers 2 have an underside formed with a grooved passageway or recess 8c which is bounded by two confronting sidewalls 8d, as shown in particular in FIGS. 7, 8 and 10, and which is engaged by the driving belts 8a, 8b as the containers 2 travel through the entry zone 3.

The containers 2 are then received in the switch zone 4 which includes a switch mechanism in the form of an operating element 9 for regulating the further advance of the containers 2. The operating element 9 is configured as a leaf spring having one end (the left-hand end in FIG. 1) which is securely fixed in the area adjacent to the entry zone 3 and an opposite end (right-hand end in FIG. 1) which can be bent for deflection to the right or left depending on which of the transport paths is desired.

Disposed in the exit zone is a propulsion and guide assembly, generally designated by reference numeral 10 and including modules 10a, 10b 10c which are respectively associated to the transport paths in the exit zone 5. In other words, the module 10a cooperates with the right transport path, module 10b cooperates with the straight transport path, and module 10c cooperates with the left transport path. The modules 10a, 10b, 10c can be moved between an idle lower position and an operative elevated position with respect to the plane of the support assembly 8 and are implemented in the form of a roller and driving belt combination. In the switch position as shown in FIG. 1, the containers 2 travel in the straight transport path so that the associated module 10b assumes the elevated disposition above the plane of the support elements 6 of the support assembly, while the modules 10a, 10c for the right and left transport paths are lowered to their idle position.

Figure 2:
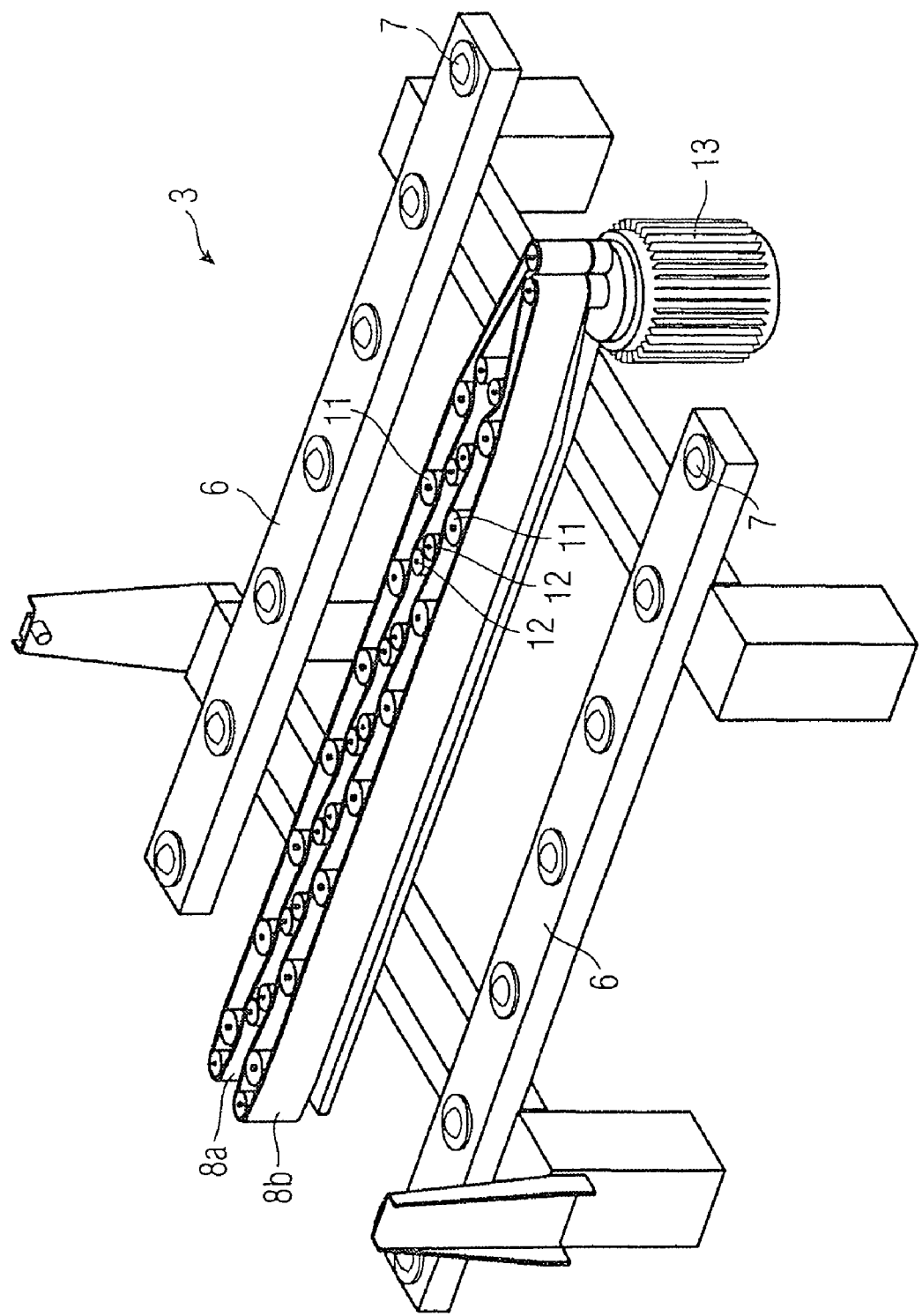
FIG. 2 is a cutaway perspective view, on an enlarged scale, of an entry zone of the switch of FIG. 1.

Turning now to FIG. 2, there is shown a cutaway perspective view, on an enlarged scale, of the entry zone 3 of the switch 1. Both driving belts 8a, 8b extend perpendicular to the plane of the support elements 6 and project beyond the support elements 6. The driving belts 8a, 8b are guided by cylindrical rollers 11, 12 which turn about rotation axes also extending perpendicular to the plane of the support elements 6. The rollers 12 are additionally swingably supported about an offset axis in parallel relationship to the rotation axes of the rollers 11, 12 so that the rollers 12 are urged outwardly by the belt and the driving torque of a motor, shown here only by way of pinion 13. The driving belts 8a, 8b engage the recess 8c of the containers 2 for their advance and respectively bear upon the parallel sidewalls 8d. As a consequence of the swingable support of the rollers 11, 12, the outwardly directed belt sides are pressed against the sidewalls 8d of the recess 8c. In this way, possible tolerances of the containers 2 can be compensated in a play-free manner.

Figure 3:
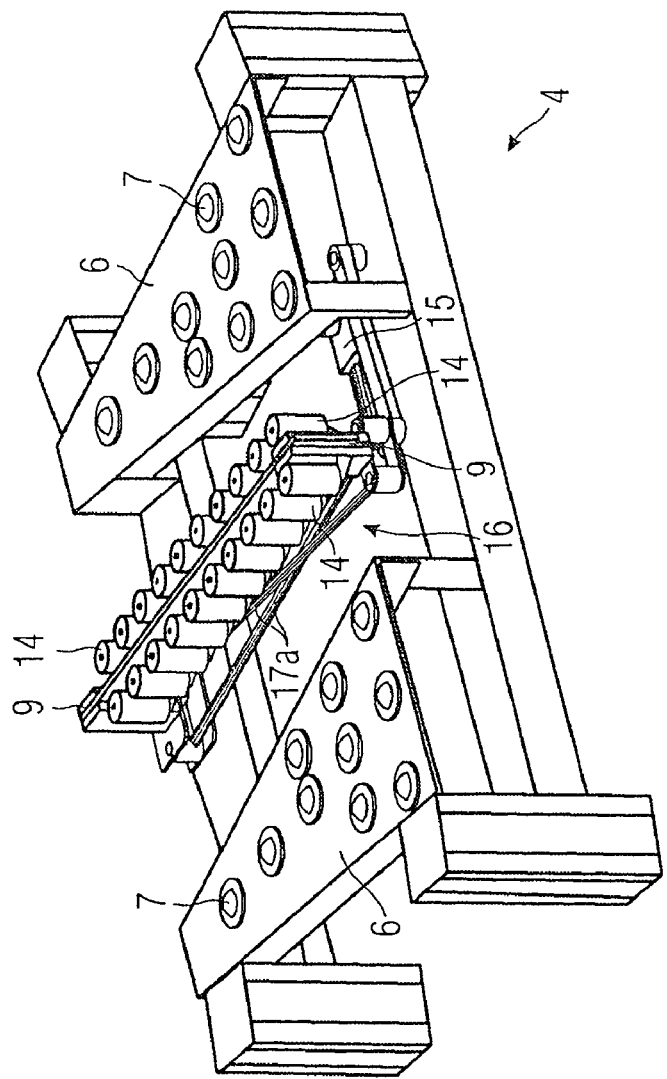
FIG. 3 is a cutaway perspective view, on an enlarged scale, of the switch, showing in detail the area of the switch with the switch mechanism.
Figure 4:
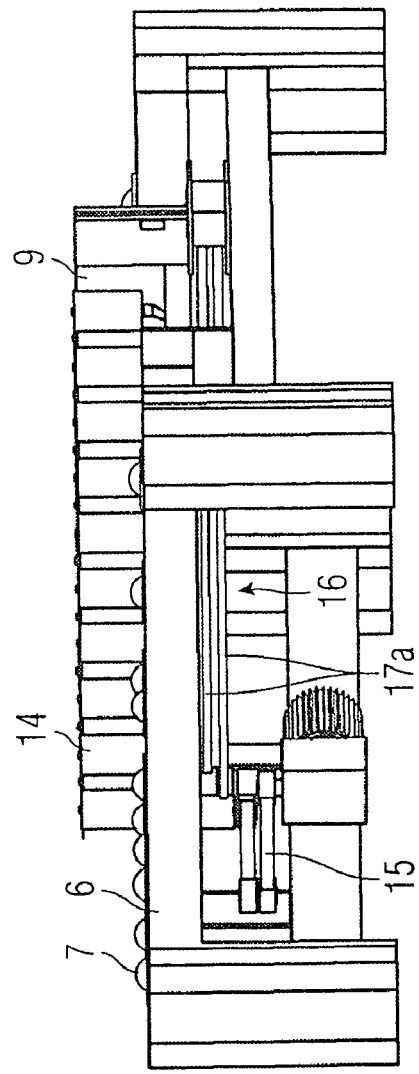
FIG. 4 is a side view of the switch mechanism.

FIG. 3 is a top perspective view, on an enlarged scale, and FIG. 4 a front view of the switch zone 4. The leaf spring 9 is arranged perpendicular to the plane of the support elements 6, whereby freely rotatable guide rollers 14 in the form of a roller path are arranged on the opposite flat sidewalls of the leaf spring 9. The leaf spring 9 can be deflected into the desired direction by a rocker arm 15 which interacts with a four-bar linkage 16 with two bars 17a, whereby the leading part of the leaf spring 9, as viewed in transport direction of the containers 2, is deflected by the rocker arm 15.

Figure 5:
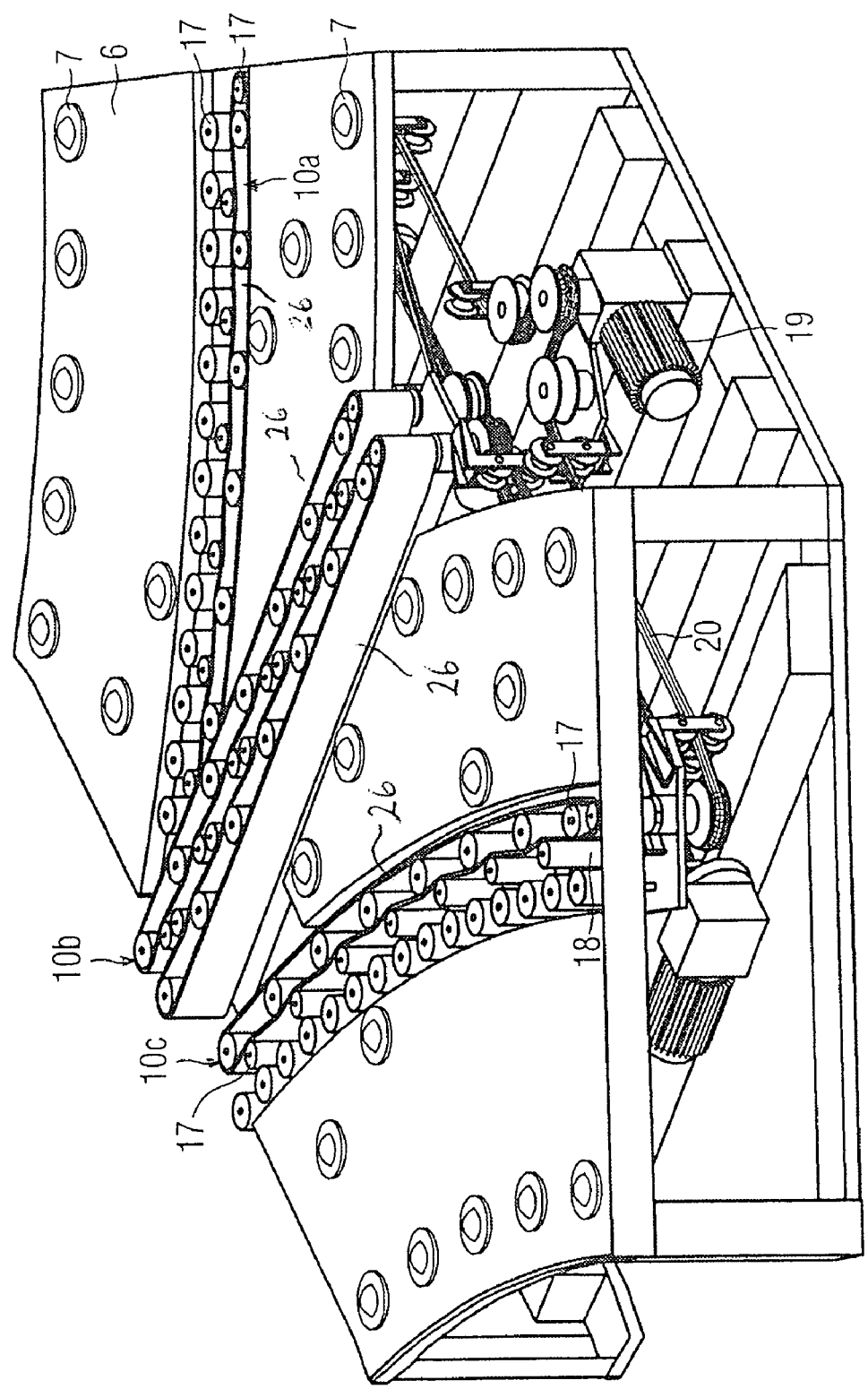
FIG. 5 is a cutaway perspective view of an exit zone of the switch of FIG. 1.
Figure 6:
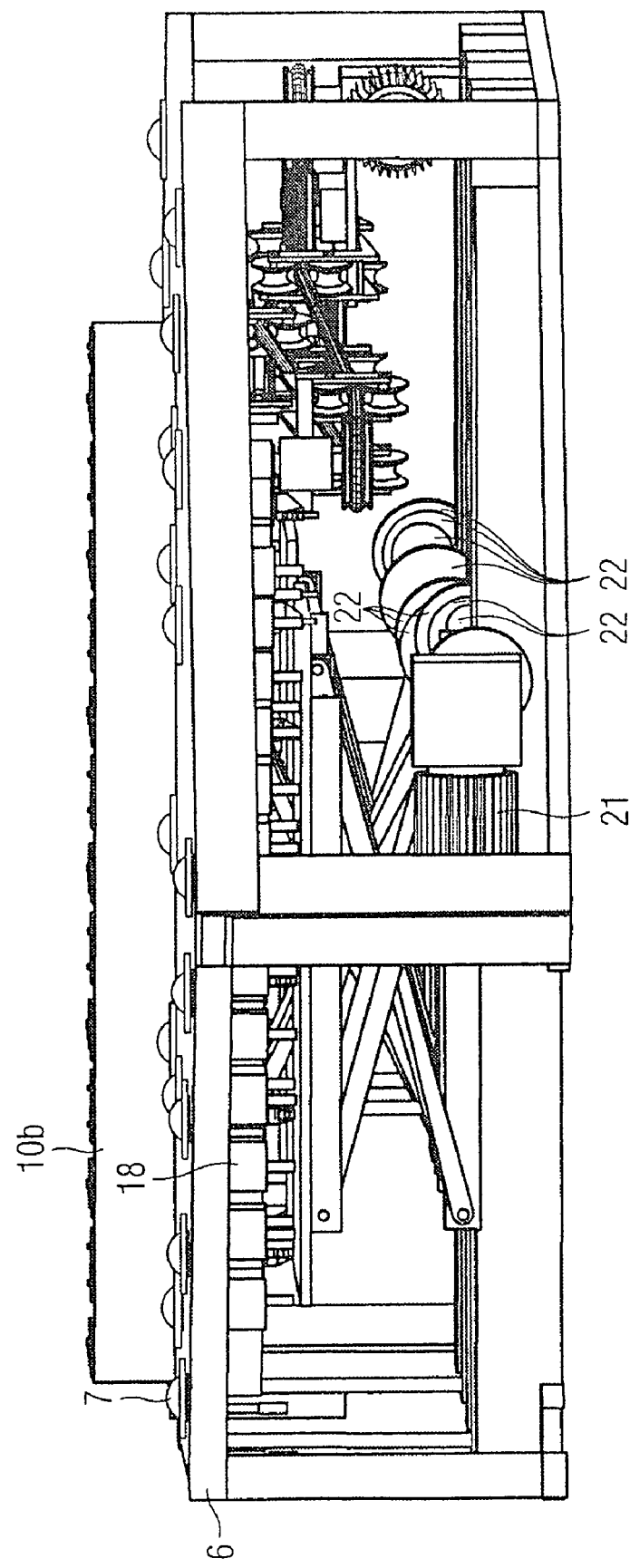
FIG. 6 is a front view of the exit zone.

Turning now to FIG. 5, there is shown a top perspective view of the exit zone 5 of the switch 1, while FIG. 6 shows the pertaining front view thereof. As can be seen in FIG. 5, the module 10*b* of the propulsion and guide assembly 10 that is provided for straight travel of the containers 2 includes two parallel driving belts 26, in analogy to the alignment and propulsion mechanism 8. Thus, as the containers 2 are advanced, the outwardly directed belt sides are pressed against the sidewalls 8*d* of the containers 2. Both revolving driving belts 26 of module 10*b* provide the necessary propulsion of the containers 2. The difference to the driving belts 8*a*, 8*b* resides in the capability to lower the driving belts 26 to the idle disposition. The module 10*c* for the left transport path and the module 10*a* for the right transport path are slightly differently configured and include only a single driving belt 26 which extends in a curved way and is respectively driven and guided by cylindrical rollers 17. Disposed parallel to the driving belt 26 of each module 10*a*, 10*c* are guide rollers 18 which are lined up to form a roller path. When elevated, the driving belt 26 of the modules 10*a*, 10*c* also engages the recess 8*c* of the containers 2 to direct them to the desired transport path. Propulsion is realized by a drive motor having a pinion 19, as shown in FIG. 5. Transmission of the driving torque is hereby implemented by a driving belt 20. As shown in FIG. 6, an additional servomotor, shown here only by way of pinion 21, is provided and has a motor shaft for support of cams 22. By means of the servomotor in combination with the cams 22, lifting elements (not shown) are actuated to selectively elevate and lower the modules 10*a*, 10*b*, 10*c* of the propulsion and guide assembly 10 in a manner that only one of the modules 10*a*, 10*b*, 10*c* can be elevated at any time while the other two are idle and in the lowered disposition.

Turing now to FIGS. 7 and 8, there are shown perspective views of modified embodiments of the alignment and propulsion mechanism 8 and the propulsion and guide assembly 10. Parts corresponding with those in FIG. 1 are denoted by identical reference numerals and not explained again. The description below will center on the differences between the embodiments. In the embodiments of FIGS. 7 and 8, provision is made for slightly beveled rollers 23, instead of driving belts. The rollers 23 are arranged behind one another in parallel rows and roll on the sidewalls 8*d* of the recess 8*c*. The sidewalls 8*d* are here inclined to the outside away from one another with increasing outward curving toward their mid-section. FIG. 7 shows the rollers 23 in a curved section, whereas FIG. 8 shows the arrangement of rollers 23 in a straight section.

Figure 9:
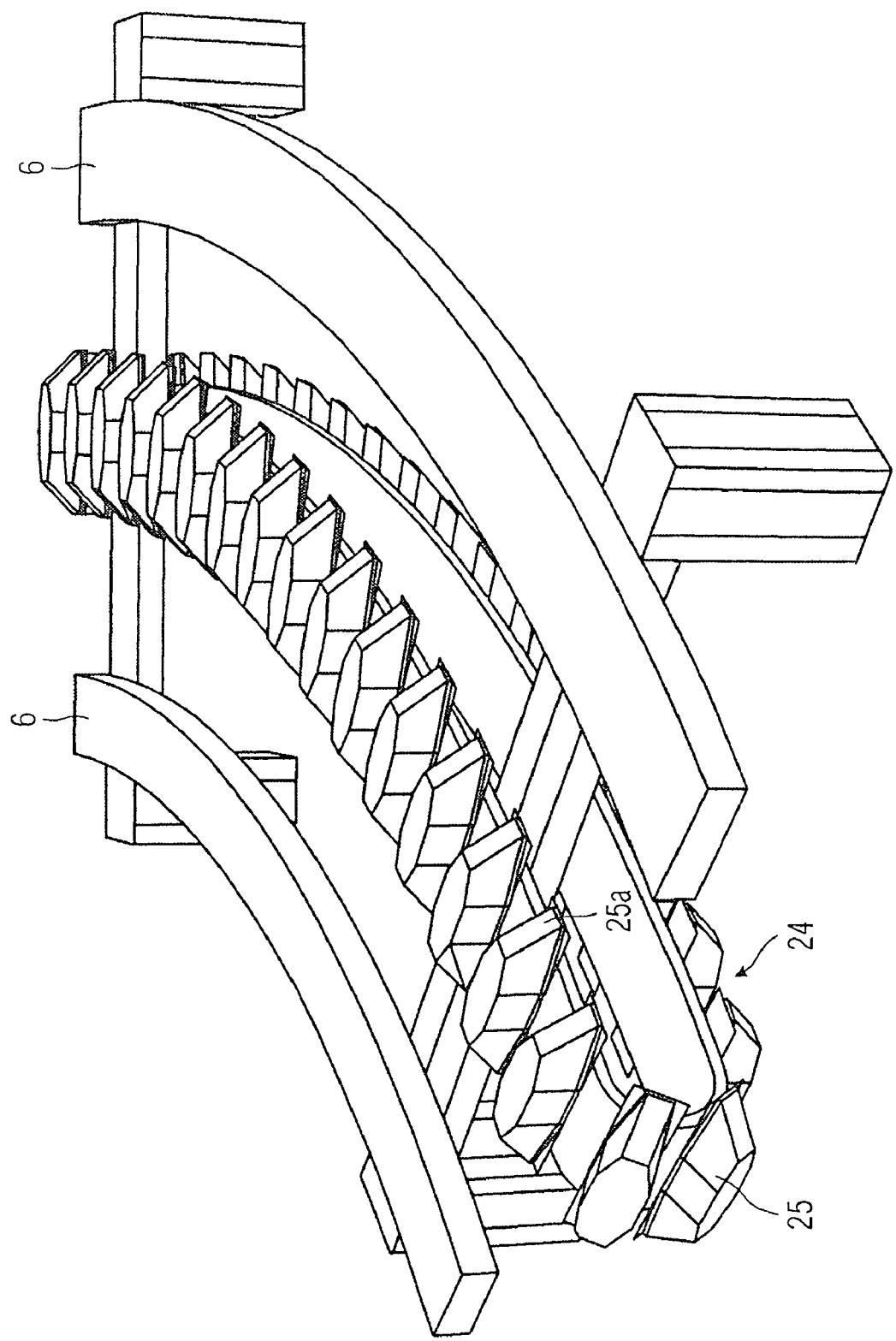
FIG. 9 is a perspective illustration of a propulsion and guide assembly in the exit zone of another embodiment of a switch.

Further alternative embodiments are shown in FIGS. 9 and 10, whereby the alignment and propulsion mechanism 8 and the propulsion and guide assembly 10 can be configured in the form of a flat-top chain 24 with parallel prisms 25 (or trapezoids). The prisms 25 engage the recess 8*c* of the containers 2, as shown in FIG. 10, to guide and advance the containers 2 through frictional engagement, whereby the outwardly directed prism sides 25*a* rest against the sidewalls 8*d*.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A transport system for transport of containers, comprising:
    at least one switch having an entry zone, an exit zone with at least two different transport paths for conveying a container to conveyors immediately disposed downstream of the exit zone, and a switch mechanism for selectively controlling the transport of the container to the transport paths;
    a support assembly defining a plane for support of the container between the entry zone and the exit zone;
    an alignment and propulsion mechanism disposed in the entry zone for aligning and advancing the container in a controlled manner;
    a propulsion and guide assembly rendered operative in response to a transport of the container along the transport paths, said propulsion and guide assembly including a control mechanism and at least two modules disposed in the exit zone below the plane of the support assembly and constructed for elevation into the transport paths in one-to-one correspondence above the plane of the support assembly, said modules operated by the control mechanism such that only the one of the modules is raised into a plane above the plane of the support assembly when the container is intended for transport along the transport path associated with the one module, wherein the alignment and propulsion mechanism has a catch member extending transversely to the plane of the support assembly and constructed for engagement against opposite longitudinal sides of a recess formed in an underside of the container and extending in longitudinal direction of the container to thereby apply a contact pressure upon the container and advance the container.

2. The transport system of claim 1, wherein the catch member includes two driving belts which are routed about rollers and have outer belt sides for abutment against the longitudinal sides of the recess, each of said rollers defining an axis extending transversely to the plane of the support assembly.

3. The transport system of claim 2, wherein the longitudinal sides of the recess extend in parallel relationship.

4. The transport system of claim 1, wherein the catch members are configured as cone-shaped rollers rolling on the longitudinal sides of the recess.

5. The transport system of claim 4, wherein the longitudinal sides of the recess extend slantingly outwards away from one another.

6. The transport system of claim 1, wherein each of the longitudinal sides of the recess is configured with increasingly outward curvature toward a mid-section thereof.

7. The transport system of claim 1, wherein the support assembly has rotatably supported ball rollers for support of the container.

8. The transport system of claim 1, wherein the support assembly has sliding surfaces for support of the containers.

9. The transport system of claim 1, wherein each of the modules of the propulsion and guide assembly includes rollers extending transversely to the plane of the support assembly for engagement against opposite longitudinal sides of a recess of the container to advance the container by rolling on the longitudinal sides.

10. The transport system of claim 1, wherein the propulsion and guide assembly includes a servomotor for operating the modules, said servomotor having a motor shaft for support of cam plates which actuate lifting elements for selectively lifting and lowering the modules.

11. The transport system of claim 1, wherein at least one of the alignment and propulsion mechanism and the propulsion and guide assembly is constructed as flat-top chain with prisms or trapezoids disposed transversely to a chain moving direction in parallel relationship, wherein the prisms or trapezoids engage in a longitudinal recess of the container to thereby realize a frictional engagement with slanted longitudinal sides of the recess for guiding and advancing the container, whereby the prisms or trapezoids have outwardly directed sides resting against the longitudinal sides.

12. A transport system for transport of containers, comprising:
    at least one switch having an entry zone, an exit zone with at least two different transport paths for conveying a container to conveyors immediately disposed downstream of the exit zone, and a switch mechanism for selectively controlling the transport of the container to the transport paths;
    a support assembly defining a plane for support of the container between the entry zone and the exit zone;
    an alignment and propulsion mechanism disposed in the entry zone for aligning and advancing the container in a controlled manner;
    a propulsion and guide assembly rendered operative in response to a transport of the container along the transport paths, said propulsion and guide assembly including a control mechanism and at least two modules disposed in the exit zone below the plane of the support assembly and constructed for elevation into the transport paths in one-to-one correspondence above the plane of the support assembly, said modules operated by the control mechanism such that only the one of the modules is raised into a plane above the plane of the support assembly when the container is intended for transport along the transport path associated with the one module,
    wherein each of the modules of the propulsion and guide assembly includes rollers extending transversely to the plane of the support assembly, and at least one driving belt, for engagement against opposite longitudinal sides of a recess of the container to advance the container.

13. A transport system for transport of containers, comprising:
    at least one switch having an entry zone, an exit zone with at least two different transport paths for conveying container to conveyors immediately disposed downstream of the exit zone, and a switch mechanism for selectively controlling the transport of the container to the transport paths;
    a support assembly defining a plane for support of the container between the entry zone and the exit zone;
    an alignment and propulsion mechanism disposed in the entry zone for aligning and advancing the container in a controlled manner;
    a propulsion and guide assembly rendered operative in response to a transport of the container along the transport paths, said propulsion and guide assembly including a control mechanism and at least two modules disposed in the exit zone below the plane of the support assembly and constructed for elevation into the transport paths in one-to-one correspondence above the plane of the support assembly, said modules operated by the control mechanism such that only the one of the modules is raised into a plane above the plane of the support assembly when the container is intended for transport along the transport path associated with the one module,
    wherein the switch mechanism includes an operating element in the form of a leaf spring, which extends transversely to the plane of the support assembly and has opposite flat sides, and plural guide rollers disposed on the flat sides in parallel relationship, said leaf spring having one end securely fixed in an entry-zone-proximal region and another end outwardly deflectable through bending.

14. The transport system of claim 13, wherein the switch mechanism includes a rocker arm constructed for outwardly deflecting the leaf spring, and a four-bar linkage for guiding the leaf spring along a radius of curvature.

* * * * *